Patented Apr. 22, 1930

1,755,640

UNITED STATES PATENT OFFICE

ERICH FISCHER, OF HOCHST-ON-THE-MAIN, GERMANY, ASSIGNOR TO GENERAL ANILINE WORKS, INC., OF NEW YORK, N. Y., A CORPORATION OF DELAWARE

PROCESS FOR DYEING CELLULOSE ESTERS OR CELLULOSE ETHERS

No Drawing. Application filed September 9, 1926, Serial No. 134,582, and in Germany September 17, 1925.

My present invention relates to a process for dyeing cellulose esters and ethers and to dyestuffs suitable for this purpose.

I have found that disazo dyestuffs, containing not more than one naphthalene nucleus, at most one sulfo group and at least one free or substituted amino group, prepared by coupling one mole of a mono- or dihydroxy derivative of the benzene or naphthalene series with two molecular proportions of a diazo compound, are eminently suitable for dyeing cellulose esters or ethers. By the term mono- or dihydroxybenzenes or mono- or dihydroxynaphthalenes I mean also homologues or substitution products thereof capable of being coupled, and by the term diazo-compound I mean and diazo compound, for instance those of the benzene or naphthalene series, substituted or not.

The following examples illustrate my invention, but they are not intended to limit it thereto:

1. 1 kg. of acetate silk is dyed for ¾ to one hour at 60–70° C. in a dye-bath containing 20–25 litres of water, in which are dissolved 20 grams of the dyestuff:

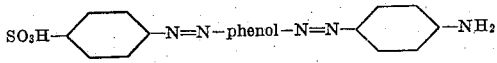

obtained by combining one molecule of para-diazobenzenesulfonic acid and one molecule of diazotized para-nitraniline with one molecule of phenol and subsequently reducing the nitro dyestuff by means of sodium sulfide. The dyeing thus produced on the fibre is a deep golden-yellow.

2. If the dyestuff defined in the foregoing example is replaced by an equivalent quantity of the dyestuff:

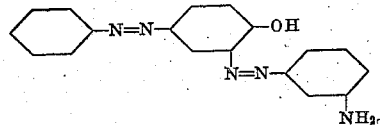

coupled with phenol coupled with meta-phenylenediamine, a beautiful yellow shade of good fastness is obtained on the acetyl cellulose.

Similar dyestuffs are obtained by substituting for the sulfanilic acid for instance naphthionic acid, aminonaphthoic acid, anthranilic acid or the like.

3. Analogous dyestuffs, in which resorcine is used as coupling component, give orange to brown dyeings on acetate cellulose.

4. If in the foregoing examples the coupling components named therein are replaced by α-naphthol, dyestuffs are obtained which give on acetate silk shades varying between yellowish-brown to brown.

The diazo compounds specified in the foregoing examples may be replaced by any other diazo compounds. Likewise there may be substituted for the coupling components any other hydroxy- or dihydroxy derivative of the benzene or naphthalene series capable of being coupled twice, as for instance dihydroxynaphthalene.

I claim:

1. The process which comprises dyeing a compound of the group consisting of cellulose esters and ethers with a disazo dyestuff containing not more than one naphthalene nucleus and not more than one sulfo group, and at least one amino-group, which may be substituted, obtainable by combining two molecules of a diazo compound with a hydroxy compound of the aromatic series capable of being coupled twice.

2. The process which comprises dyeing a compound of the group consisting of cellulose esters and ethers with a disazo dyestuff of the following composition:

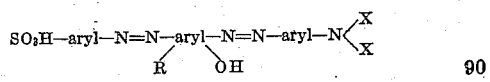

wherein the term "aryl" represents a nucleus of the group consisting of the benzene and naphthalene series, at least two aryls being nuclei of the benzene series, R represents a hydroxy group, hydrogen or any substituent and X may be hydrogen or any substituent.

3. The process which comprises dyeing a compound of the group consisting of the cellulose esters and ethers with a disazo dyestuff of the following composition:

$SO_3H-C_6H_4-N=N\rightarrow$
$\phantom{SO_3H-C_6H_4-N=N}$ phenol$-N=N-C_6H_4-NH_2$ 4. Compounds of the group consisting of cellulose esters and ethers dyed according to the process described in claim 1.

5. Compounds of the group consisting of cellulose esters and ethers dyed according to the process described in claim 2.

6. Compounds of the group consisting of cellulose esters and ethers dyed according to the process described in claim 3.

In testimony whereof, I affix my signature.

ERICH FISCHER.